US007181407B1

(12) United States Patent
Kanevsky et al.

(10) Patent No.: US 7,181,407 B1
(45) Date of Patent: Feb. 20, 2007

(54) NETWORK OF PORTABLE, WIRELESS COMMUNICATION DEVICES

(75) Inventors: Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 09/706,645

(22) Filed: Nov. 6, 2000

(51) Int. Cl.
*G06Q 99/00* (2006.01)

(52) U.S. Cl. ............................................. 705/1
(58) Field of Classification Search ............... 705/1
See application file for complete search history.

(56) References Cited

U.S. PATENT DOCUMENTS

| 4,369,426 | A | * | 1/1983 | Merkel ..................... 340/904 |
| 5,334,974 | A | * | 8/1994 | Simms et al. .............. 340/990 |
| 5,712,619 | A | * | 1/1998 | Simkin ................... 340/539.13 |
| 5,832,497 | A | * | 11/1998 | Taylor ..................... 707/104.1 |
| 5,960,337 | A | * | 9/1999 | Brewster et al. ......... 455/404.2 |
| 6,028,514 | A | * | 2/2000 | Lemelson et al. ....... 340/539.13 |
| 6,052,122 | A | * | 4/2000 | Sutcliffe et al. ............ 345/751 |
| 6,144,964 | A | * | 11/2000 | Breese et al. ................ 707/10 |
| 6,272,467 | B1 | * | 8/2001 | Durand et al. ............... 705/1 |
| 6,289,340 | B1 | * | 9/2001 | Puram et al. .................. 707/5 |
| 2001/0034630 | A1 | * | 10/2001 | Mayer et al. ................ 705/7 |
| 2002/0042846 | A1 | * | 4/2002 | Bottan et al. ............. 709/249 |
| 2002/0086676 | A1 | * | 7/2002 | Hendrey et al. ........... 455/445 |
| 2002/0090954 | A1 | * | 7/2002 | Tanaka et al. ............. 455/456 |
| 2002/0107008 | A1 | * | 8/2002 | Hendrey et al. ........... 455/416 |

FOREIGN PATENT DOCUMENTS

| JP | 2000057213 A | * | 2/2000 |
| WO | WO 200062266 A1 | * | 10/2000 |
| WO | WO 200201405 A1 | * | 1/2002 |

OTHER PUBLICATIONS

Rubec, Peter, "New Technologies for Emergency Response." Geo Info Systems, Nov. 1998.*
Memmott, Carol, "A World of Possibilities." Town & Country Monthly, 231(1), Dec. 1998.*
"AOL Foundation Launches Helping.org to Make Philanthropy Easy and Convenient," Business Wire, Oct. 20, 1999.*

* cited by examiner

*Primary Examiner*—Jonathan Ouellette
(74) *Attorney, Agent, or Firm*—Scully, Scott, Murphy & Presser, P.C.; Daniel P. Morris, Esq.

(57) ABSTRACT

A volunteer network support group for people with disabilities. People who would like to assist people with disabilities may join a service and receive a wearable device or a palmtop that can communicate wirelessly through a network. People that join the volunteer network describe the type of disability they are willing/certified to assist with, available time and other relevant information. People with disabilities also join the volunteer service network and are provided with a wearable wireless device (i.e. Palm top). Disabled persons also specify their particular disability as well as services that they may require. An example of how these volunteers may be of use is: When a volunteer is gong to work in the morning on the train, the service can connect them through the network to a blind person, and the volunteer may assist the blind person by reading a newspaper through the wireless device (like a cellular telephone).

20 Claims, 6 Drawing Sheets

| Name of person with disability  Description of methods how to help 205 | Description of needs | Type of handicap | History | List of volunteers who helped |
|---|---|---|---|---|
| 200 | 201 | 202 | 203 | 204 |

| Name of volunteer | Description of skills | Description of services that he/she can offer | History |
|---|---|---|---|
| List of people with disabilities that he/she helped | Expenses (tax deductible) | | |

NETWORK OF PORTABLE, WIRELESS COMMUNICATION DEVICES

BACKGROUND OF THE INVENTION

1. Field of the Invention

This invention generally relates to a network of portable, wireless communications devices and including plural databases.

2. Prior Art

Often times people need assistance when no professional help is available. For example, if someone on a train is hurt or in need of medical assistance, then a loudspeaker may announce that a doctor is needed. A similar scenario may occur on an airplane. This is an example of being able to help someone who is in obvious need of medical attention and people have noticed. Another example of people with disabilities receiving aid from people in their near surroundings is when a blind person is attempting to cross the street. In some instances, a passing stranger may assist the blind person in crossing the street safely.

These are examples of how people with disabilities may receive assistance from others in their environment. However, there are numerous other examples and scenarios where people in need of assistance do not receive any aid. It is necessary to set up a system where people with many types of disabilities can receive assistance from volunteers.

SUMMARY OF THE INVENTION

One object of the invention is to provide a business method for organizing volunteers for helping people with disabilities.

Another object of the invention is to provide technical means that support communication between volunteers and people with disabilities (PwD) through network.

Another object of the invention is a mechanism for choosing volunteers that match Pwd needs.

In accordance with this invention, people who would like to assist people with disabilities may join a service and receive a wearable device or a palmtop that can communicate wirelessly through a network. People that join the volunteer network describe the type of disability they are willing/certified to assist with, available time and other relevant information. People with disabilities also join the volunteer service network and are provided with a wearable wireless device (i.e. Palm top). Disabled persons also specify their particular disability as well as services that they may require.

An example of how these volunteers may be of use is: When a volunteer is going to work in the morning on the train, the service can connect them through the network to a blind person, and the volunteer may assist the blind person by reading a newspaper through the wireless device (like a cellular telephone). Another example is if a volunteer knows sign language and a hearing impaired person is in need of an interpreter, the audio of the conversation of the disabled person can be transmitted via the wireless device to the volunteer who can, in turn, translate into sign language and be visually depicted on a screen of the disabled person; or if the volunteer is nearby, they can send a signal to the hearing-impaired person that they will come and assist them as soon as possible. Global positioning may be used in order to assist in determining the positions of volunteers and disabled persons to provide more efficient and expedient assistance to people who are near to each other.

Another example is, if a person is unable to move (i.e. quadriplegic, Multiple Sclerosis, Parkinson's Disease, etc.) and needs some type of goods, whether clothing or food. This person may contact the Volunteer Network with a request, and the system can find a volunteer who is near or maybe even in the same building who can bring the requested item. If any prescriptions or medicines need to be delivered by somebody who is in the vicinity of another volunteer, the system can find them and request the two volunteers to cooperate in the retrieval and delivery of the medicines (or other goods). A more detailed description of the methodology and examples may be found in the detailed description of figures.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
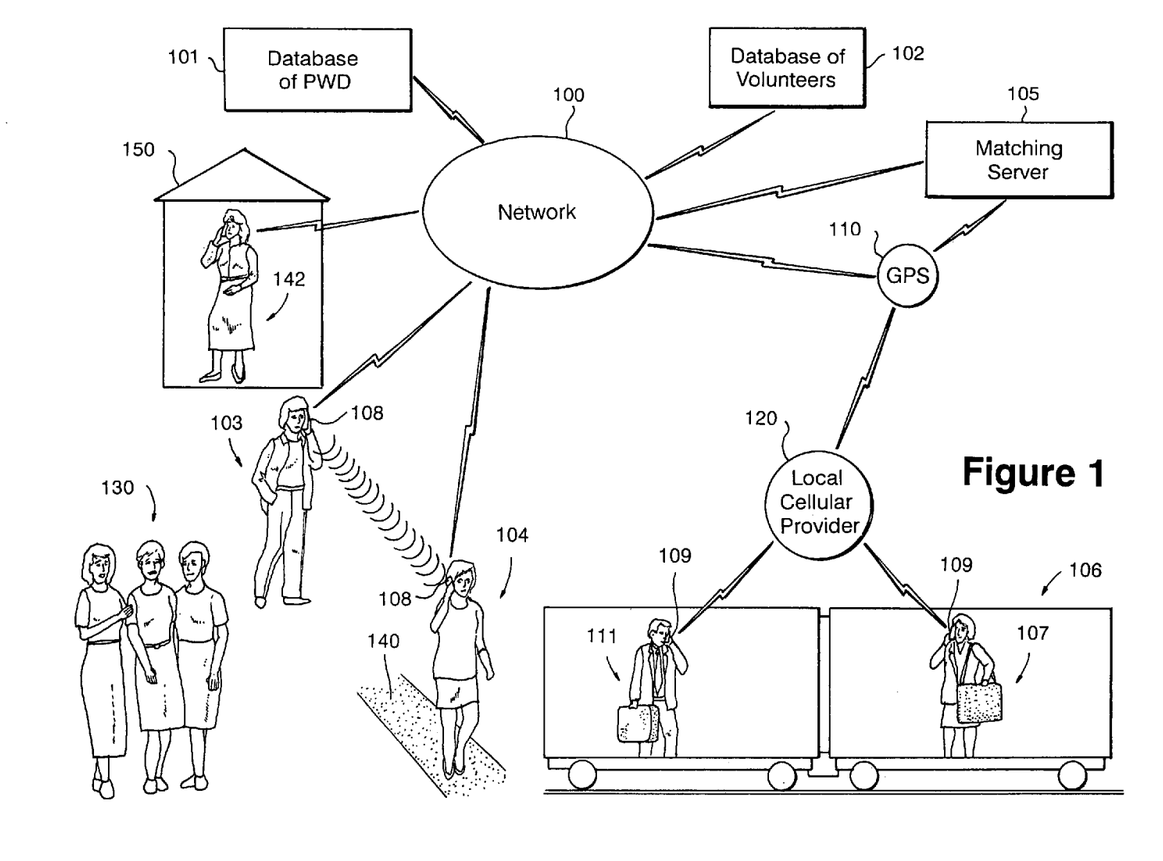
FIG. 1 is a general block diagram illustrating a network embodying this invention.

Module 100 in FIG. 1 symbolizes the general network. People 103, 104 that carry the wireless/cellular device 108 are connected to the network 100. The wireless device 108 may also transmit to another wireless device 108. If there is a crowd of people 130 and the person 103 needs assistance but does not know where to go on street 140, person 103 can send a signal to person 104 via the wireless devices 108 that help is needed. This signal from 108 to 108 is sent locally and not through the network because these people are not far from each other and the volunteer 104 receives the message via audio or beep/text. Because these people are not far from each other, volunteer 104 can notice the disabled person/person in need of assistance and walk/drive over and assist the person.

Another scenario for the implementation of this device is on a train 106 and there are two people with two devices, person 111 with device 109 and person 107 with device 109, sitting in different parts of the train. If person 107 needs assistance with a conversation (a sign interpreter) the person sends a signal through the device 109 through a cellular provider 120 that sends a signal to the global positioning system 110 that notifies the person of the volunteer's location. The device 109 then sends this information to a local cellular provider that sends a signal to any volunteers on the train (that may know sign language) through their device 109 that may then come to the person in need of assistance 107 and translate for them. The network is connected to a database 101 that contains a description of all of the people with disabilities that are connected to the server 105. A detailed description of the information on the database is given below. Another database of volunteers 102 is connected to the server 105 via the network 100. The particulars of the volunteer database will be further discussed below.

The matching server 105 uses the information in database servers 101 and 102 to notify people with disabilities and volunteers what types of services it may offer. For example, the matching server may find some people who need a newspaper read to them because they are blind during a certain time. The matching server finds that there are volunteers available to assist the blind people (because they may be riding home from work on the train) and the server contacts the volunteers and asks them to read the newspaper/book or other information to the disable persons over the cellular phone. As in the previous example where person 111 can read a newspaper over the cellular phone to person in need of assistance 140 at home 150.

There two different ways how people may find themselves. The global positioning system that finds the coordinates of people, where two people are connected to the network and they require assistance, they send a message through the network to two people who may be able to assist them and the global positioning system helps them find each other.

The GPS satellites are highly accurate atomic clocks. They broadcast their current time using extremely wide band signals. The receiver picks up the time from (at least) four satellites and measures the difference in arrival times from each. Because the satellites are at known coordinates in geosynchronous orbit, the differences in arrival time of the radio signals can be used to determine the distance the receiver is from each satellite. This is normally accurate to a few meters. However, the military perturbs the time signals using random noise to control the accuracy in what is known as "selective availability."

There also exist D-GPS or differential GPS systems, in which case a fixed ground based transmitter sends its location and time to a D-GPS receiver. These systems send "corrections" to the time signals that are perturbed by the military. In so doing, the GPS accuracy can increase to a few meters. Using more advanced techniques, for stationary objects, it is possible to actually achieve accuracy in the centimeter range (essentially using a form of interferometry. In any case, there is no signal sent out from the GPS receivers. They know where they are relative to the GPS satellites, which are all in know spatial coordinates.

With reference again to FIG. 1, The matching server may also have access to information about routes and local maps in order to assist the users in finding each other. The matching server also has access to a disabled persons needs, addresses, necessary medications and other information from the database of people with needs and disabilities 101.

Figure 2:
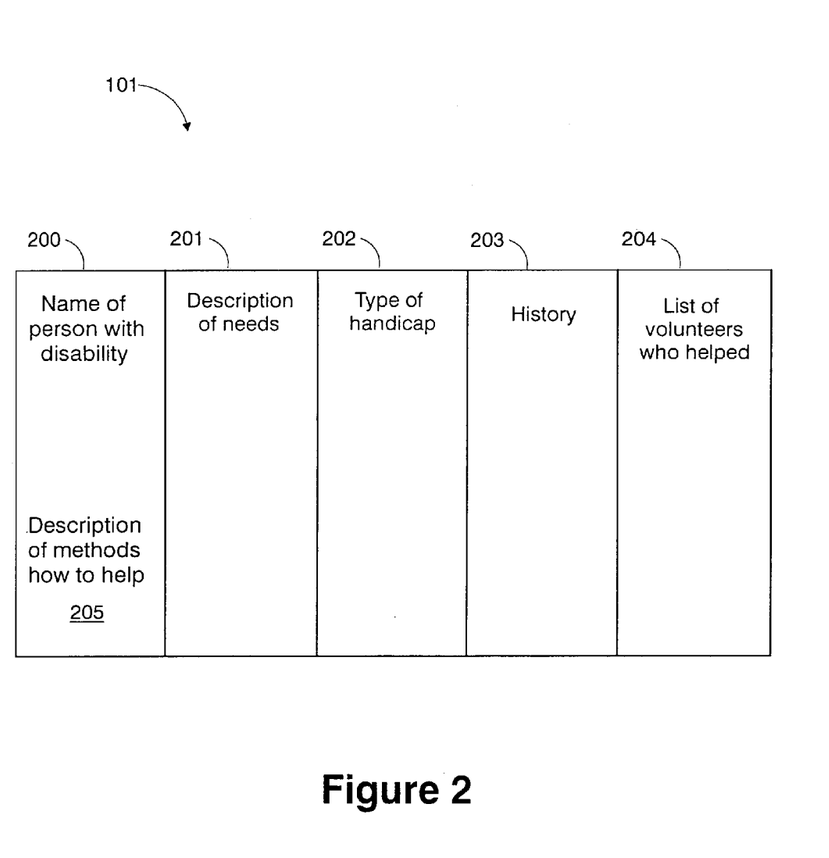
FIG. 2 shows an example of a database of persons with disabilities.

FIG. 2 provides a detailed example of the database of people with disabilities 101. Module 200 contains the name of the person with disabilities. Module 201 is a description of the person's needs. For instance, 201 may say that the person needs a newspaper read to them, medicine or groceries brought to them, or a conversation translated into sign/or other language. Module 202 notes the type of handicap—blind, hearing-impaired, paralyzed, etc. Module 203 gives a history of prior assistance and help that may guide future volunteers as well as for statistical information that can aid the matching server in creating more efficient and satisfactory service. The matching server can use this information to help plan outlines for assistance for future volunteers. Module 204 is a list of volunteers who helped the disabled person in the past which is connected to the history 203, in order to find a volunteer with experience that is able to help quickly. Module 205 gives a description of methods of how to assist a disabled person. For instance, if a person needs a newspaper read to them, the system may describe a method for how a volunteer can read the newspaper over the phone; or, if a person needs to go to an office or receive information, then the system notes that the person requires an interpreter.

Figure 3:
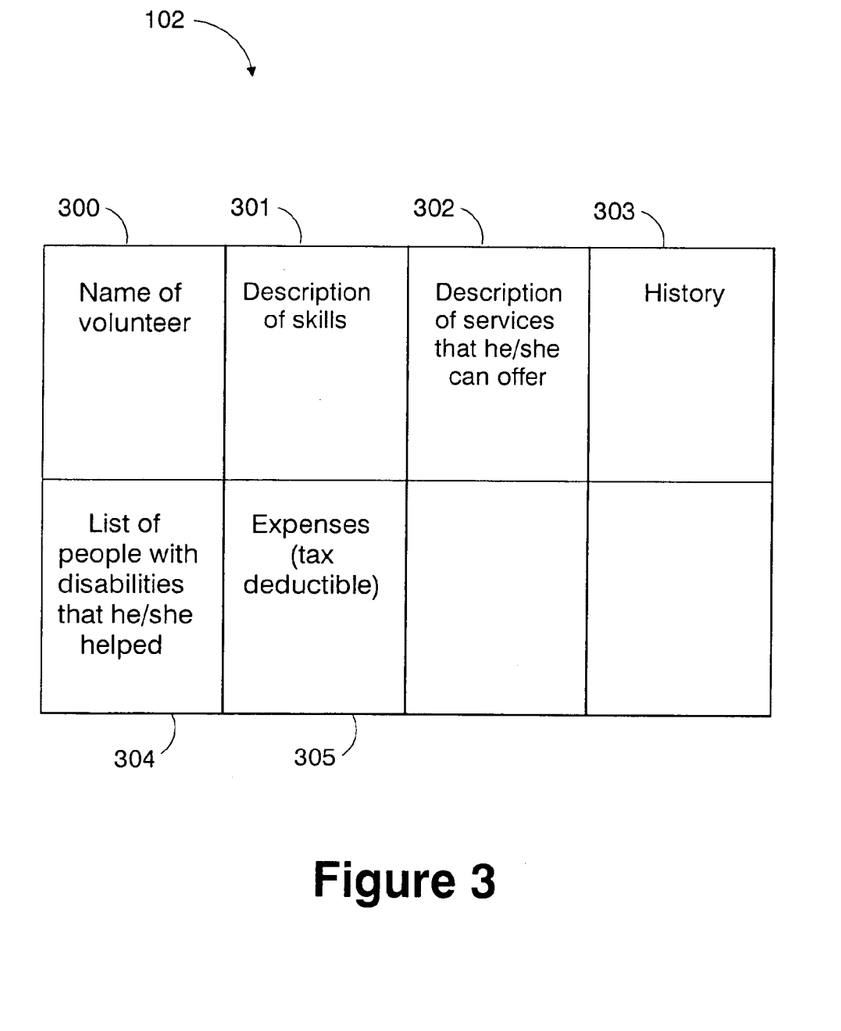
FIG. 3 shows an example of a database of volunteers.

FIG. 3 is a detailed example of a database of volunteers 102. Module 300 indicates the name of the volunteer. Module 301 describes the skills of the volunteers, for example—sign language or masseuse therapist. Module 302 gives a description of services that the volunteer could offer. Module 303 gives a history of people the volunteer has helped. This information assists the matching server in assembling a statistical history that aids optimizing volunteer assistance to people with disabilities. Module 304 gives a list of the people with disabilities that the volunteer has helped. Module 305 gives a list of expenses of the volunteer so they may be reimbursed or tax-deductible like a donation.

Figure 4:
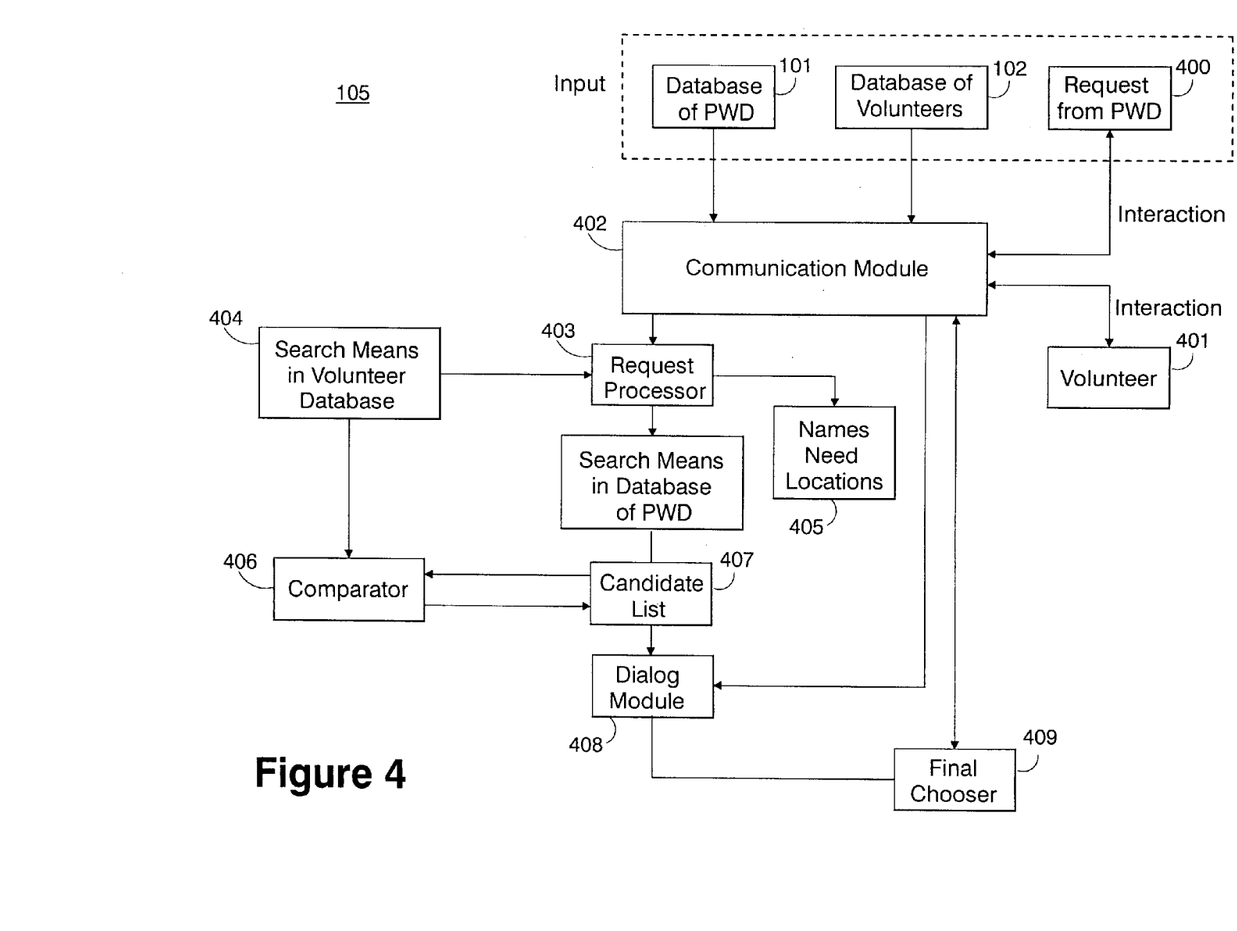
FIG. 4 describes a matching server that may be employed in the network of FIG. 1.

FIG. 4 is a detailed outline of the matching server 105. The matching server receives input from the database of people with disabilities 101 and the database of volunteers 102. The input goes into the communication module 402 in the matching server. The communication module is connected to the network and uses data from the databases in order to choose the correct volunteer that may assist a given person with disabilities. The communication module 402 also receives requests from the person with disabilities 400 through the network (wireless). When the communication module receives a request it contacts both of the database 101 and 102 and decides to which volunteers it can send messages. In other words, when the module chooses an appropriate number of volunteers and people with disabilities, this information enters into module 403, the request processor.

From the moment a request from a person with disabilities comes in, the information goes into the request processor that processes the information of the person (names, needs, location 405). The location may be determined with a global positioning system through cellular devices. After a processor has determined the name of the person it does a search in volunteer database 404 to determine which volunteers have the functions that may assist the person with disabilities. It also retrieves an image of the person with disabilities in order to determine which type of people have already assisted the person. This information goes into the comparator 406 where volunteers with different functions, abilities, and certifications are compared as well as their locations with the people with disabilities: who helped who when, was it satisfactory? The comparator makes a candidate list 407 with names of volunteers, ranking of satisfaction of person with disabilities, ways they may serve the people with disabilities. At this point, there is the option to either send the message to several volunteers (if they are all on the same train they may all go to assist the person in need). The other option is to have a dialogue module 408 between the volunteer and the person with disabilities to find a good match.

The module 408 may send information about the location and nature of the problem to the volunteer and receive a response whether the volunteer wishes to assist the person. After several questions, the dialogue module and the comparator sends information into the final chooser which picks the best candidates and sends them a request to attend to the person with disabilities. 408 and 409 also check for a confirmation and turns off once one has been reached. If there is no confirmation received, a message is sent to another candidate.

Figure 5:
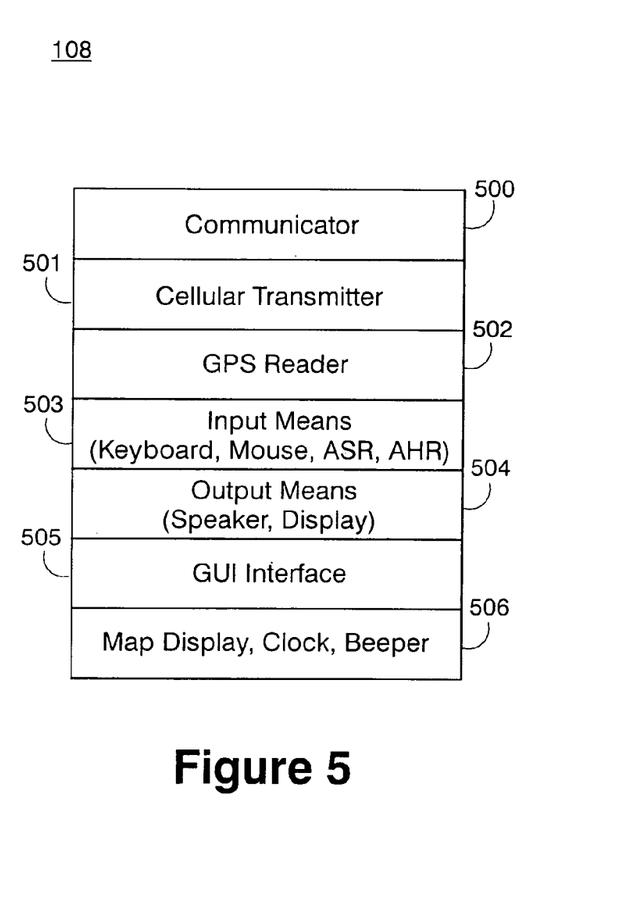
FIG. 5 describes a cellular portable device that may be used in the network of FIG. 1.

FIG. 5 gives a detailed description of the cellular portable device that the persons with disabilities and volunteers carry in order to communicate. Module 500 is the communicator that communicates with the network. Module 501 is the cellular transmitter to send a signal to and from the user (information about helping). Module 502 receives and sends information by a Global positioning system reader through a satellite. Module 503 are the different means of input: keyboard, mouse, ASR, AHR. Module 504 is the output means Speaker, Display, and others, among them module 505 which is the GUI interface. The GUI interface allows for effective operation of the device. Additionally there is the option for map display, a clock and a beeper (announcing a message) in module 506.

Figure 6:
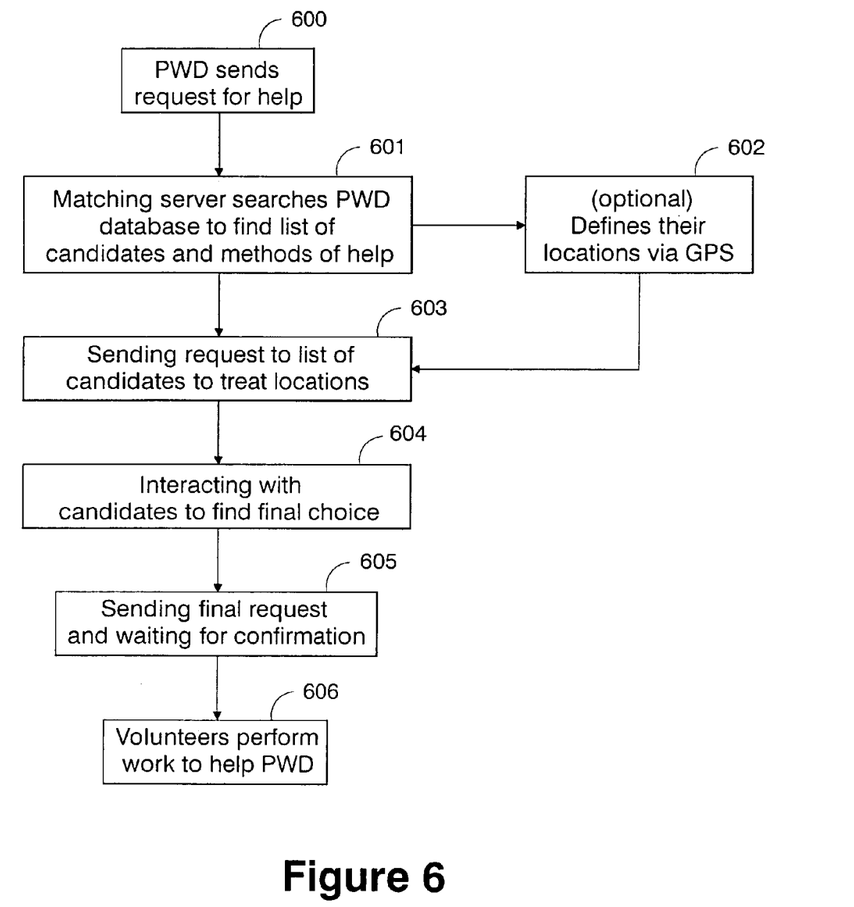
FIG. 6 is a flow chart illustrating a method of practicing this invention.

FIG. 6 is a flowchart of a preferred embodiment of the invention. Module 600 is when the person with disabilities sends a request for help. In 601, the matching server searches the people with disabilities and volunteers to find a list of candidates and methods of help. In module 602 (optional because can give coordinates), defines the locations via Global Positioning system. Module 603 sends a request to the list of candidates to treat locations. Module 604 is interacting with candidates to find the final choice. Module 605 sending final request and wait for conformation. Module 606 volunteers perform work to help people with disabilities after they have been chosen.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of providing help to people with disabilities, comprising the steps:
    a) organizing a network of people with disabilities and of volunteers for helping people with disabilities, each of the persons with disabilities and each of the volunteers having a portable, wireless communications device;
    b) establishing a first database identifying and having information about a plurality of people with disabilities and for each of the persons with disabilities, identifying at least one specific disability said person has; wherein the step of establishing the first database includes the steps of identifying and having information in the first database about each of said plurality of people with disabilities, and for each of said people with disabilities, identifying in the first database,
        i) a description of the needs of the person,
        ii) the type of handicap of the person,
        iii) a history of prior assistance given to the person,
        iv) a list of volunteers who have helped the person in the past, and
        v) a description of methods of how to help the person;
    c) establishing a second database identifying a plurality of volunteers, and for each of the volunteers, identifying at least one specific disability said volunteer is willing to assist; wherein the step of establishing the second database includes the steps of identifying in the second database the plurality of volunteers, and for each of said volunteers identifying in the second database,
        i) the name of the volunteer,
        ii) skills of the volunteer,
        iii) services that the volunteer can offer,
        iv) a history of prior help given by the volunteer, and
        v) a list of people the volunteer has helped;
    d) after the first and second databases are established, at least one of the persons with disabilities, using one of the wireless communications devices to transmit a request for help;
    e) in response to said request, using a matching server to obtain information about the person making the request from the pre-established first database and to use that information obtained from the first database to identify in the second database one of the volunteers who is willing to assist with the specific disability said at least one of the persons with disabilities has,
    f) after said one of the volunteers is identified, using the matching server to notify said one of the volunteers of the request for help via one of the wireless communications devices; and
    g) the matching server providing information to at least one of (i) said one of the volunteers, or (ii) the person making the request, to enable said one of the volunteers and the person making the request to physically find and meet each other.

2. A method according to claim 1, wherein:
    step (c) includes the step of one of the persons with disabilities using one of the wireless communications devices to transmit a request for help to the network; and
    step (d) includes the step of the network identifying said one of the persons with disabilities to said one of the volunteers via one of the wireless communications devices.

3. A method according to claim 2, further comprising the step of, the volunteers providing at least one service selected from the group comprising:
    i) reading a newspaper or other information to a blind person,
    ii) translating a conversation into sign language, and
    iii) bringing requested items to one of the persons with disabilities.

4. A method according to claim 2, further comprising the step of using a global positioning system to identify the location of said one of the persons with disabilities, and to identify one or more of the volunteers in the vicinity of said one of the persons with disabilities.

5. A method according to claim 2, wherein the matching step includes the step of:
    using a matching server to search the people with disabilities and the volunteers to find a list of candidate volunteers and methods of help;
    sending a request to each of the candidate volunteers;
    interacting with the candidate volunteers to find a final choice volunteer; and
    sending a final request to the final choice volunteer.

6. A method according to claim 1, wherein the step of using the matching server to identify one of the volunteers includes the step of:
    using the matching server
        i) to identify several candidate volunteers,
        ii) to establish dialogues between the person requesting help and the candidate volunteers, and
        iii) on the basis of said dialogues, selecting one of the candidate volunteers to assist the person requesting help.

7. A method according to claim 1, wherein the matching server includes a dialogue module, and comprising the further step of using the dialogue module to establish communications between the volunteer and the person making the request for help.

8. A method according to claim 1, wherein the step of using the matching server to identify one of the volunteers includes the step of using the matching server to identify volunteers who have already assisted the person making the request for help.

9. A method according to claim 1, wherein the person who transmits the request needs medicine, and the step of using the matching server to notify said one of the volunteers includes the step of notifying a second of the volunteers, and comprising the further step of said one and said second of the volunteers cooperating in the retrieval and delivery of medicine to the person making the request.

10. A method according to claim 1, wherein the step of using the matching server to obtain information includes the steps of:
- the matching server making a candidate list with names of candidate volunteers,
- providing the matching server with a dialogue module, a comparator and a chooser,
- the matching server establishing dialogues between the person making the request and the candidate volunteers, said dialogue including several questions, and
- after several questions, the dialogue module and the comparator sending information into the chooser which selects one of the candidate volunteers to assist the person requesting help.

11. A system for providing help to people with disabilities, comprising:
- a network of people with disabilities and of volunteers for helping people with disabilities, each of the persons with disabilities and each of the volunteers having a portable, wireless communications device; and
- a first database identifying and having information about a plurality of people with disabilities and for each of the persons with disabilities, identifying at least one specific disability said person has; wherein the first database identifies, for each of said plurality of people with disabilities,
  i) a description of the needs of the person,
  ii) the type of handicap of the person,
  iii) a history of prior assistance given to the person,
  iv) a list of volunteers who have helped the person in the past, and
  v) a description of methods of how to help the person;
- a second database identifying a plurality of volunteers, and for each of the volunteers, identifying at least one specific disability said volunteer is willing to assist; wherein the second database identifies, for each of said plurality of volunteers,
  i) the name of the volunteer,
  ii) skills of the volunteer,
  iii) services that the volunteer can offer,
  iv) a history of prior help given by the volunteer, and
  v) a list of people the volunteer has helped;
- at least one of the persons with disabilities after the first and second databases are established, using one of the wireless communications devices to transmit a request for help; and
- a matching server to obtain information about the person making the request from the first and second pre-established database, in response to said request, and to use that information obtained from the first database to identify in the second database one of the volunteers who is willing to assist with the specific disability said at least one of the persons with disabilities has, and the matching server including
  i) means to notify said one of the volunteers, after said one of the volunteers is identified, of the request for help via one of the wireless communications devices; and
  ii) means for providing information to at least one of (i) said one of the volunteers, or (ii) the person making the request, to enable said one of the volunteers and the person making the request to physically find and meet each.

12. A system according to claim 11, wherein:
- one of the persons with disabilities uses one of the wireless communications devices to transmit a request for help to the network;
- the network includes
  means for identifying said one of the persons with disabilities to said one of the volunteers via one of the wireless communications devices.

13. A system according to claim 12, further comprising a global positioning system to identify the location of said one of the persons with disabilities, and to identify one or more of the volunteers in the vicinity of said one of the persons with disabilities.

14. A system according to claim 12, wherein the matching means includes:
- a matching server to search the people with disabilities and the volunteers to find a list of candidate volunteers and methods of help;
- means for sending a request to each of the candidate volunteers;
- means for interacting with the candidate volunteers to find a final choice volunteer; and
- means for sending a final request to the final choice volunteer.

15. A program storage device readable by machine, tangibly embodying a program of instructions executable by the machine to perform method steps for providing help to people with disabilities, said method steps comprising:
a) organizing a network of people with disabilities and of volunteers for helping people with disabilities, each of the persons with disabilities and each of the volunteers having a portable, wireless communications device;
b) establishing a first database identifying and having information about a plurality of people with disabilities and for each of the persons with disabilities, identifying at least one specific disability said person has; wherein the step of establishing the first database includes the steps of identifying and having information in the first database about each of said plurality of people with disabilities, and for each of said people with disabilities, identifying in the first database,
  i) a description of the needs of the person,
  ii) the type of handicap of the person,
  iii) a history of prior assistance given to the person,
  iv) a list of volunteers who have helped the person in the past, and
  v) a description of methods of how to help the person;
c) establishing a second database identifying a plurality of volunteers, and for each of the volunteers, identifying at least one specific disability said volunteer is willing to assist; wherein the step of establishing the second database includes the steps of identifying in the second database the plurality of volunteers, and for each of said volunteers identifying in the second database,
  i) the name of the volunteer,
  ii) skills of the volunteer,
  iii) services that the volunteer can offer, iv) a history of prior help given by the volunteer, and
v) a list of people the volunteer has helped;
d) after the first and second databases are established, at least one of the persons with disabilities, using one of the wireless communications devices to transmit a request for help; and
e) in response to said request, using a matching server to obtain information about the person making the request from the pre-established first and to use that information obtained from the first database to identify in the second database once of the volunteers who is willing to assist with the specific disability said at least one of the persons with disabilities has,
f) after said one of the volunteers is identified, using the matching server to notify said one of the volunteers of the request for help via one of the wireless communications devices; and
g) the matching server providing information to at least one of (i) said one of the volunteers, or (ii) the person making the request, to enable said one of the volunteers and the person making the request to physically find and meet each other.

16. A program storage device according to claim 15, wherein:
step (c) includes the step of one of the persons with disabilities using one of the wireless communications devices to transmit a request for help to the network; and
step (d) includes the step of the network identifying said one of the persons with disabilities to said one of the volunteers via one of the wireless communications devices.

17. A program storage device according to claim 16, wherein said method steps further comprise the step of, the volunteers providing at least one service selected from the group comprising:
i) reading a newspaper or other information to a blind person,
ii) translating a conversation into sign language, and
iii) bringing requested items to one of the persons with disabilities.

18. A program storage device according to claim 16, wherein said method steps further comprise the step of using a global positioning system to identify the location of said one of the persons with disabilities, and to identify one or more of the volunteers in the vicinity of said one of the persons with disabilities.

19. A program storage device according to claim 16, wherein the searching step includes the step of:
using a matching server to search the people with disabilities and the volunteers to find a list of candidate volunteers and methods of help;
sending a request to each of the candidate volunteers;
interacting with the candidate volunteers to find a final choice volunteer; and
sending a final request to the final choice volunteer.

20. A method of providing help to people with disabilities, comprising the steps:
a) organizing a network of people with disabilities and of volunteers for helping people with disabilities, each of the persons with disabilities and each of the volunteers having a portable, wireless communications device;
b) establishing a first database identifying and having information about a plurality of people with disabilities and for each of the persons with disabilities, identifying at least one specific disability said persons has; and establishing a second database identifying a plurality of volunteers, and for each of the volunteers, identifying at least one specific disability said volunteer is willing to assist;
c) after the first and second databases are established at least one of the persons with disabilities, using one of the wireless communications devices to transmit a request for help;
d) in response to said request, using a matching server to obtain information about the person making the request from the pre-established first database and to use that information obtained from the first database to identify in the second database one of the volunteers who is willing to assist with the specific disability said at least one of the persons with disabilities has,
e) after said one of the volunteers is identified, using the matching server to notify said one of the volunteers of the request for help via one of the wireless communications devices; and
the matching server providing information to at least one of (i) said one of the volunteers, or (ii) the person making the request, to enable said one of the volunteers and the person making the request to physically find and meet each other; and wherein:
the step of establishing the first database includes the steps of identifying and having information in the first database about each of said plurality of people with disabilities, and for each of said people with disabilities, identifying in the first database,
i) a description of the needs of the person,
ii) the type of handicap of the person,
iii) a history of prior assistance given to the person,
iv) a list of volunteers who have helped the person in the past, and
v) a description of methods of how to help the person;
the step of establishing the second database includes the steps of identifying in the second database the plurality of volunteers, and for each of said volunteers identifying in the second database,
i) the name of the volunteer,
ii) skills of the volunteer,
iii) services that the volunteer can offer,
iv) a history of prior help given by the volunteer, and
v) a list of people the volunteer has helped;
the person who transmits the request and a group of the volunteers are on a train;
the step of using one of the wireless devices to transmit the request includes the steps of sending a signal through the wireless device and through a local cellular provides that sends a signal to a global positioning system that notifies the person making the request of the location of one of said group of volunteers;
the step of using the matching server to obtain information about the person making the request includes the step of the matching server retrieving an image of the person making the request to determine which type of people have already assisted the person making the request;
the step of using the matching server to obtain information includes the step of the matching server making a candidate list with names of volunteers, ranking of satisfaction of people with disabilities, and ways the volunteers may serve the people with disabilities;
the step of using the matching server to obtain information includes the further steps of
i) providing the matching server with a dialogue module, a comparator and a chooser, ii) the matching server establishing dialogues between the person making the request and the candidate volunteers, said dialogue including several questions, and iii) after several questions, the dialogue module and the comparator sending information into the chooser which selects one of the candidate volunteers to assist the person requesting help; and the method comprises the further steps of:

the wireless device of the person who transmits the request sending information to the local cellular provides that then sends a signal to any volunteer on the train the wireless device of said any volunteer, said one of the volunteers translating a conversation into sign language, including the steps of i) the person who transmits the request, using said one of the wireless devices to transmit an audio conversation to said one of the volunteers, ii) said one of the volunteers translating said audio conversation into sign language, and iii) visually depicting the sign language of said one of the volunteers on a screen of the person making the request.

* * * * *